(12) United States Patent
Kim et al.

(10) Patent No.: US 9,450,278 B2
(45) Date of Patent: Sep. 20, 2016

(54) CATHODE MATERIAL FOR LITHIUM—OXYGEN BATTERY

(71) Applicants: International Business Machines Corporation, Armonk, NY (US); Volkswagen Aktiengesellschaft, Wolfsburg (DE)

(72) Inventors: Ho-Cheol Kim, San Jose, CA (US); Bryan D. McCloskey, Campbell, CA (US); Rouven Scheffler, Los Altos, CA (US); Angela-Kristina Speidel, Sunnyvale, CA (US); Sally A. Swanson, San Jose, CA (US); Gregory M. Wallraff, San Jose, CA (US)

(73) Assignees: International Business Machines Corporation, Armonk, NY (US); Volkswagen AG, Wolfsburg (DE)

( * ) Notice: Subject to any disclaimer, the term of this patent is extended or adjusted under 35 U.S.C. 154(b) by 322 days.

(21) Appl. No.: 13/722,925

(22) Filed: Dec. 20, 2012

(65) Prior Publication Data

US 2014/0178774 A1 Jun. 26, 2014

(51) Int. Cl.
| | |
|---|---|
| *H01M 12/08* | (2006.01) |
| *H01M 4/90* | (2006.01) |
| *H01M 10/052* | (2010.01) |
| *H01M 4/86* | (2006.01) |
| *H01M 4/92* | (2006.01) |

(52) U.S. Cl.
CPC .......... *H01M 12/08* (2013.01); *H01M 4/8673* (2013.01); *H01M 4/9016* (2013.01); *H01M 4/8652* (2013.01); *H01M 4/92* (2013.01); *H01M 10/052* (2013.01); *H01M 2004/8689* (2013.01); *Y02E 60/122* (2013.01); *Y02E 60/50* (2013.01); *Y02P 70/54* (2015.11); *Y02T 10/7011* (2013.01)

(58) Field of Classification Search
CPC ..................................................... H01M 12/08
USPC .......................................................... 429/405
See application file for complete search history.

(56) References Cited

U.S. PATENT DOCUMENTS

| | | | |
|---|---|---|---|
| 6,962,613 | B2 | 11/2005 | Jenson |
| 7,767,345 | B2 | 8/2010 | Imagawa et al. |
| 7,877,120 | B2 | 1/2011 | Jacobs et al. |
| 2008/0176124 | A1* | 7/2008 | Imagawa et al. ............... 429/27 |

(Continued)

FOREIGN PATENT DOCUMENTS

EP  2511972 A2  10/2012

OTHER PUBLICATIONS

Cheng, H., and K. Scott. "Carbon-supported Manganese Oxide Nanocatalysts for Rechargeable Lithium-air Batteries." Journal of Power Sources 195.5 (2010): 1370-374.*

(Continued)

*Primary Examiner* — James Lee
(74) *Attorney, Agent, or Firm* — Shumaker & Sieffert, P.A.

(57) ABSTRACT

A lithium-oxygen battery may include an anode, a cathode, and an electrolyte between, and in contact with, the anode and the cathode. The anode may include lithium and/or a lithium alloy. In some examples, the cathode defines a surface that is predominantly metal oxide with an electron conductivity of at least $10^{-1}$ Siemens per centimeter. In some examples, the cathode defines a surface in contact with oxygen, and includes ruthenium oxide. In some examples, the cathode defines a surface that is substantially covered by ruthenium oxide and is in contact with oxygen.

7 Claims, 11 Drawing Sheets

(56) References Cited

U.S. PATENT DOCUMENTS

| | | | |
|---|---|---|---|
| 2009/0053594 | A1 | 2/2009 | Johnson et al. |
| 2009/0081557 | A1 | 3/2009 | Chen et al. |
| 2010/0273066 | A1 | 10/2010 | Flanagan et al. |
| 2011/0223494 | A1* | 9/2011 | Feaver et al. .............. 429/405 |
| 2012/0028137 | A1 | 2/2012 | Chase et al. |
| 2012/0107728 | A1 | 5/2012 | Ryu et al. |
| 2012/0115047 | A1 | 5/2012 | Ma et al. |
| 2012/0141889 | A1 | 6/2012 | Lee et al. |

OTHER PUBLICATIONS

Freunberger et al., "The Lithium—Oxygen Battery with Ether-Based Electrolytes," Angew. Chen. Int. Ed. 50, 2011, pp. 8609-8613.

Ishihara et al., "Rechargeable Lithium-Air Battery Using Mesoporous Co3O4 Modified with Pd for Air Electrode," Electrochemistry 80 (10):731-733, published Oct. 5, 2012.

Girishkumar et al., "Lithium-Air Battery: Promise and Challenges," J. Phys. Chem. Lett. 1:2193-2203, Jul. 2010.

McCloskey et al., "Twin Problems of Interfacial Carbonate Formation in Nonaqueous Li—O2 Batteries," J. Phys Chem. Lett. 3:997-1001, Mar. 2012.

Christensen et al., "A Critical Review of Li/Air Batteries," Journal of the Electrochemical Society 159(2):R1-R30, published Dec. 2011.

Thapa et al., "Mesoporous a-MnO2/Pd catalyst air electrode for rechargeable lithium-air battery," Journal of Power Sources 196:7016-7020, Oct. 2011.

Lu et al., "In Situ Ambient Pressure X-ray Photoelectron Spectroscopy Studies of Lithium—Oxygen Redox Reactions," Scientific Reports 2:715, pp. 1-6, published Oct. 8, 2012.

McCloskey et al., "Twin Problems of Interfacial Carbonate Formation in Nonaqueous Li—O2 Batteries," J. Phys. Chem. Lett., 3(8), pp. 997-1001 (Mar. 2012).

Freunberger et al., "Improving electrolytes for Lithium-ion and Lithium—oxygen batteries," Angew. Chem Int. Ed. 50, 8609-8613 (Jul. 2011).

International Search Report and Written Opinion of international application No. PCT/US2013/076857, dated Apr. 24, 2014, 14 pp.

* cited by examiner

CATHODE MATERIAL FOR LITHIUM—OXYGEN BATTERY

TECHNICAL FIELD

The disclosure relates to lithium-oxygen batteries.

BACKGROUND

Battery technology is continually being developed to enable higher energy density and greater efficiency, thereby permitting use of batteries as power sources for more applications. For example, there is currently a great drive toward the use of batteries for electric vehicle propulsion. Current battery technologies, such as lead-acid or lithium ion batteries, have a lower gravimetric energy density (e.g., expressed as watt-hours per kilogram; Wh/kg) than is desired for use in extended range electric vehicles. Other applications for battery technology may also benefit from battery technologies that provide a higher energy density.

A rechargeable lithium-oxygen (Li—$O_2$) battery can store, theoretically, about 5-10 times more energy than current lithium ion batteries. The high energy density makes the Li—$O_2$ battery very attractive as an emerging energy storage system for a wide range of applications, including propulsion of electric vehicles. A Li—$O_2$ battery is composed of a Li metal anode, an air cathode, where oxygen is accessed from the external environment, and an electrolyte containing Li salts, which is in contact with both the anode and cathode. In some examples, oxygen may be provided from air, in which case, the battery may be referred to as a Li-air battery.

SUMMARY

Li—$O_2$ and Li-air batteries operate by reduction of $O_2$ to form lithium peroxide ($Li_2O_2$) on the cathode during discharge, with the process being reversed on charge. Because the chemistry during battery operation is related to generation of superoxides and peroxides (e.g., $Li_2O_2$), which are highly reactive, the chemical stability of materials used for the cathode affects whether the Li—$O_2$ battery is stable over repeated charges and discharges.

This disclosure describes a new material for a cathode of a Li—$O_2$ battery. In some examples, the cathode material may include an electrically conductive metal oxide that includes an electron conductivity of at least about $10^{-1}$ Siemens per centimeter (S/cm; about 10 S/m). In some examples, the electrically conductive metal oxide may be active to the electrochemistry of the Li—$O_2$ battery, e.g., to the oxygen reduction reaction (ORR) and oxygen evolution reaction (OER) that occur at the cathode during discharging and charging of the Li—$O_2$ battery, respectively. Additionally, in some examples, the electrically conductive metal oxide may be substantially stable in the presence of intermediates and products of the electrochemistry, such as $Li_2O_2$ and superoxides.

In some examples, the cathode material may include ruthenium oxide ($RuO_2$). $RuO_2$ is substantially chemically stable in the presence of superoxide and $Li_2O_2$, is active for the electrochemistry of a Li—$O_2$ battery, and is electrically conductive. $RuO_2$ may be present in the cathode at a concentration of greater than, for example, 10 molar percent (mol. %). $RuO_2$ may be present at a surface of the cathode. In some examples, the surface of the cathode may be substantially covered by $RuO_2$.

In one aspect, the disclosure describes a lithium-oxygen battery including an anode comprising lithium; a cathode defining a surface in contact with oxygen, wherein the cathode comprises ruthenium oxide; and a non-aqueous electrolyte between, and in contact with, both the anode and the cathode.

In a further aspect, the disclosure describes a lithium-oxygen battery including a negative electrode comprising lithium; a positive electrode defining a surface, wherein the surface is predominantly metal oxide with an electron conductivity of at least $10^{-1}$ S/cm; and an aprotic electrolyte between, and in contact with, both the negative electrode and the positive electrode.

In another aspect, the disclosure describes a method including forming a cathode comprising ruthenium oxide, forming an electrode comprising lithium, and assembling the cathode and anode with a non-aqueous electrolyte to form a lithium-oxygen battery, wherein the non-aqueous electrolyte is between, and in contact with, both the anode and the cathode.

The details of one or more examples are set forth in the accompanying drawings and the description below. Other features, objects, and advantages of the disclosure will be apparent from the description and drawings, and from the claims.

DETAILED DESCRIPTION

Figure 1:
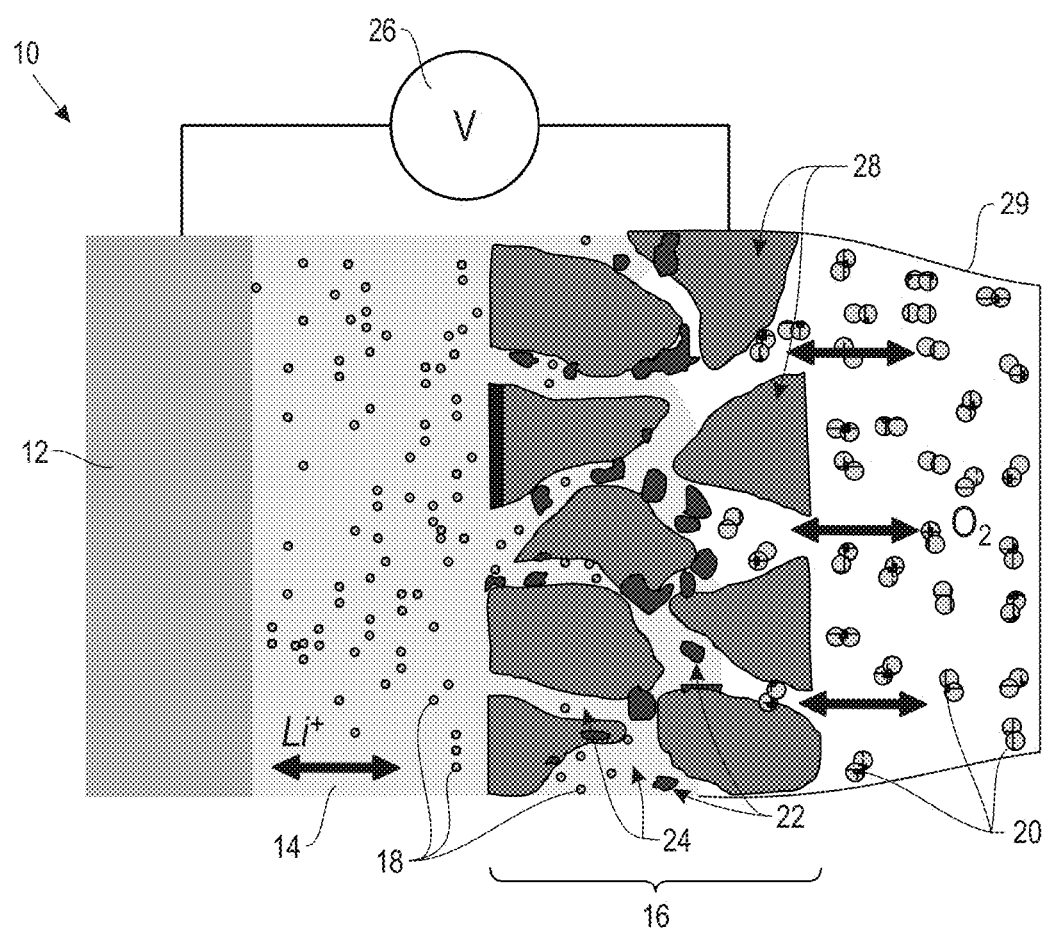
FIG. 1 is a conceptual and schematic diagram illustrating an example of an aprotic lithium-oxygen battery.

The disclosure describes lithium-oxygen (Li—$O_2$) batteries (including lithium-air batteries) and techniques for forming lithium-oxygen batteries. For example, the disclosure describes cathode materials for Li—$O_2$ batteries. The cathode materials may include, for example, ruthenium oxide ($RuO_2$), which is electrically conductive, active for the electrochemistry of the Li—$O_2$ battery, and is stable in the presence of products of Li—$O_2$ battery operation.

Li—$O_2$ batteries may provide a relatively high gravimetric energy density (watt-hours per kg; Wh/kg), e.g., compared to lithium ion or lead-acid batteries. The theoretical gravimetric energy density of a Li—$O_2$ battery is about 11,680 Wh/kg, which is calculated using the oxidation of 1 kg of lithium metal. This energy density compares favorably to the gravimetric energy density of gasoline, the current fuel of choice for vehicles, which is about 13,000 Wh/kg.

Other considerations also impact the design and function of Li—$O_2$ batteries. For example, the power density (measured in watt per kilogram; W/kg) is important for propulsion of a vehicle. The power density of Li—$O_2$ batteries is currently low. While not wishing to be bound by any theory, current research results indicate that the mechanism of energy discharge in a Li—$O_2$ battery is reduction of oxygen in the presence of lithium ions to form lithium oxides (such as lithium peroxide). Hence, very large surface areas are required to provide high power. For example, a battery with 100 kW power output at a cell voltage of 2.5 volts (V) and a current density of 25 milliamps per square centimeter (mA/cm$^2$) may require an internal surface area of 160 m$^2$.

A Li—$O_2$ battery may include one of four chemistries: aprotic liquid electrolyte, aqueous electrolyte, a mixed system including an aqueous electrolyte immersing the cathode and an aprotic electrolyte immersing the anode, and a solid-state battery including a solid electrolyte. The fundamental chemistry of energy storage and discharge is affected by the electrolyte surrounding the cathode.

The Li—$O_2$ battery described in this disclosure includes a Li metal and/or alloy anode, a cathode including a conductive, porous material, and a lithium ion (e.g., Li$^+$) conducting electrolyte, which is in contact with both the anode and the cathode. Some cathodes for Li—$O_2$ batteries use carbon as the conductive, porous material, because carbon is relatively stable to electrochemistry of the battery, allows easy preparation of highly porous structures, and is inexpensive. For example, high surface area carbon black powder may be used as a cathode after binding onto metal meshes using polymeric binders. However, carbon may react with lithium peroxide ($Li_2O_2$), a product of the battery operation, to form lithium carbonate. The reaction between $Li_2O_2$ and carbon for forming lithium carbonate is strongly exothermic.

The disclosure describes an alternative material for a cathode of a Li—$O_2$ battery. In some examples, the cathode may include ruthenium oxide ($RuO_2$). $RuO_2$ is substantially inert to the intermediates and products of Li—$O_2$ battery operation, such as $Li_2O_2$. $RuO_2$ is also electrically conductive and gives oxygen reduction reaction (ORR) and oxygen evolution reaction (OER) activity. In some examples, the cathode may include $RuO_2$ alone, or in combination with one or more other metal oxides or other materials. For example, the cathode may include a stainless steel mesh at least partially covered with a $RuO_2$ paste and/or a $RuO_2$ film. In some examples, the cathode may include a surface coverage of, e.g., greater than 10%. In some examples, the cathode may include a surface predominantly covered with $RuO_2$, e.g., at least 50% of the surface of the cathode may be covered with $RuO_2$.

In other examples, a cathode for a Li—$O_2$ battery may include a surface predominantly covered with a metal oxide that has an electron conductivity of at least about $10^{-1}$ Siemens per centimeter (S/cm; about 10 S/m). The metal oxide may cover more than 10% of the surface of the cathode, or may cover at least about 50% of the surface (i.e., may predominantly cover the surface). In some examples, the cathode may include at least two different metal oxides. The metal oxide or one of the at least two metal oxides may include $RuO_2$.

FIG. 1 is a conceptual and schematic diagram that illustrates an example of a Li—$O_2$ battery 10. In some examples, Li—$O_2$ battery 10 may utilize an aprotic electrolyte, and may be referred to as an aprotic Li—$O_2$ battery. In other examples, Li—$O_2$ battery 10 may utilize another type of electrolyte, such as an aqueous electrolyte, a mixed system including an aqueous electrolyte immersing the cathode and an aprotic electrolyte immersing the anode, or a solid electrolyte.

Li—$O_2$ battery 10 includes an anode 12. In some examples, anode 12 consists essentially of lithium. In other examples, anode 12 may include lithium alloyed with one or more additional elements. In some implementations, anode 12 may include a thin film formed on a surface of anode 12. The thin film may be a lithium-ion conductive film, such as a lithium-ion-conducting polymer, a lithium-ion-conducting block co-polymer, a lithium-ion-conducting ceramic, or a lithium-ion-conducting polymer-ceramic composite. In some examples, a thin film of lithium-stable conductive material may be present between the lithium anode and the thin film.

Anode 12 is in contact with (e.g., at least partially surrounded by) electrolyte 14. Electrolyte 14 may include a non-aqueous medium, including, but not limited to, an aprotic liquid, such as, for example, an organic solvent. The organic solvent may include, for example, an ether, including alkyl ethers or cyclic ethers (e.g., tetrahydrofuran (THF) or dioxolane); an ester, including γ-butyrolactone; N-methyl-2-pyrrolidone (NMP); dimethyl sulfoxide (DMSO); or another solvent suitable for use in a metal-air and/or metal-oxygen battery. Electrolyte 14 may solvate lithium salts, such as LiPF$_6$, LiClO$_4$, lithium bis(trifluoromethanesulfonyl)imide (LiTFSI), LiBF$_6$, LiAsF$_6$, LiN(SO$_2$CF$_3$)$_2$, LiSO$_3$CF$_3$, and/or other salts suitable for use in a metal-air and/or metal-oxygen battery, to form ions, including Li$^+$ ions 18. Electrolyte 14 also may have a relatively high oxidative stability. In other examples, electrolyte 14 may include an aqueous electrolyte, a mixed system including an aqueous electrolyte immersing cathode 16 and an aprotic electrolyte immersing lithium anode 12, or a solid electrolyte.

Li—$O_2$ battery 10 also includes a cathode 16. In some examples, cathode 16 may include an electrically conductive metal oxide that gives OER and ORR activity. In some examples, cathode 16 may be chemically stable in the presence of OER and/or ORR products, such as superoxides and/or $Li_2O_2$.

In some examples, cathode 16 includes a conductive metal oxide. In some implementations, the conductive metal oxide may possess an electron conductivity of at least $10^{-1}$ S/cm. Metal oxides that can be used, which possess an electron conductivity of at least $10^{-1}$ S/cm, include, for example, ruthenium oxide ($RuO_2$), titania suboxides ($TiO_{2-x}$), tungsten oxide ($WO_2$), strontium-ruthenium oxide (Sr$RuO_3$), chromium oxide ($CrO_2$), molybdenum oxide ($MoO_2$), rhodium oxide ($RhO_2$), technetium oxide ($TcO_2$), rhenium oxide ($ReO_2$), and/or iridium oxide ($IrO_2$). For example, $RuO_2$ possesses an electron conductivity of greater than $10^{-4}$ S/cm.

Additionally, $RuO_2$ may be present at a surface of cathode 16, such that $RuO_2$ can be in contact with gaseous oxygen molecules 20 that are provided from a back side of cathode 16. In some examples, cathode 16 may include a surface coverage of greater than about 10% of $RuO_2$. In some examples, the surface of cathode 16 may be predominantly covered (e.g., at least about 50 percent covered) with $RuO_2$.

In some examples, cathode 16 may include at least two metal oxides. In some implementations, the at least two metal oxides may include $RuO_2$ and at least one other metal oxide. The at least one other metal oxide may be electrically conductive (e.g., an electron conductivity of at least about $10^{-1}$ S/cm) in some examples. The at least one other metal oxide may provide activity for OER and/or ORR at cathode 16. In other examples, the at least one other metal oxide may not provide activity for OER and/or ORR at cathode 16. In some examples, the at least one other metal oxide may be inert to the intermediates and products of Li—$O_2$ battery operation, such as $Li_2O_2$. Hence, in some examples, the at least one other metal oxide may contribute to at least one of electrical conductivity, chemical activity, and/or inertness to intermediates and products of Li—$O_2$ battery operation. For example, the at least one other metal oxide may include a titania suboxide ($TiO_{2-x}$), $WO_2$, $SrRuO_3$, $CrO_2$, $MoO_2$, $RhO_2$, $TcO_2$, $ReO_2$, and/or $IrO_2$.

As shown in FIG. 1, cathode 16 may be formed as a porous structure. Cathode 16 may include solid portions with pores and/or channels 24 formed between the solid portions. Pores and/or channels 24 allow contact between the oxygen molecules 20 and the $Li^+$ ions 18 from electrolyte 14 at the surface of cathode 16. In this way, pores and/or channels 24 may facilitate oxidation of $Li^+$ ions 18 during the ORR and reduction of $Li_2O_2$ during the OER.

Porosity of cathode 16 may be formed in a variety of ways, such as by forming the electrically conductive metal oxide (e.g., $RuO_2$) as a monolithic, porous structure using structure-directing materials, such as a surfactant and/or other sacrificial material. For example, precursors of the electrically conductive metal oxide may be deposited simultaneously with a sacrificial material. The sacrificial material and electrically conductive metal oxide may be selected such that the electrically conductive metal oxide forms a continuous matrix phase upon deposition with discontinuous domains of sacrificial material. After deposition is complete, the sacrificial material may be removed, e.g., by heating the structure to burn the sacrificial material or by using a chemical to selectively remove the sacrificial material. Once the sacrificial material is removed, a monolithic, porous structure including the electrically conductive metal oxide remains.

As another example, cathode 16 may be formed using a paste and a structural support. In some examples, the structural support may be conductive and act as a current collector. The paste may include the electrically conductive metal oxide (e.g., $RuO_2$) powder mixed with a binder. The binder may be, for example, a thermoplastic resin or a thermosetting resin. For example, the binder may include polytetrafluoroethylene (PTFE), polyvinylidene fluoride (PVDF), polyethylene (PE), polyacrylonitrile (PAN), or the like. In some examples, the binder includes at least two thermoplastic resins and/or thermosetting resins.

The paste may be applied to structural support 28. In some examples, the structural support may be formed of an electrically non-conductive (e.g., insulating) material. The structural support may be at least partially covered with at least one electrically conductive metal oxide, e.g., $RuO_2$, a titania suboxide ($TiO_{2-x}$), $WO_2$, $SrRuO_3$, $CrO_2$, $MoO_2$, $RhO_2$, $TcO_2$, $ReO_2$, and/or $IrO_2$. In other examples, the structural support may be formed of an electrically conductive material. Structural support materials include, but are not limited to, electrically conductive powders such as metal and/or carbon powders, woven or non-woven metal fibers, metal foam, woven or non-woven carbon fibers, or the like. Other materials for the structural support may include, for example, stainless steel mesh, aluminum (Al) mesh, nickel (Ni) foam, and carbon paper.

In some examples, an electrically structural support 28 may function as a current collector. Alternatively, cathode 16 may include a separate current collector. A current collector may include a material of suitable electrical conductivity that is electrically connected to cathode 16 and collects electrons generated at the cathode 16 during discharge of Li—$O_2$ battery 10 and provides a conductive path to an external electrical circuit to which Li—$O_2$ battery 10 is connected. Similarly, during recharge of Li—$O_2$ battery 10, the current collector provides an electrical pathway between an external voltage source and cathode 16 to supply voltage for decomposition of $Li_2O_2$ via the oxygen evolution reaction (OER) (described below). For example, the current collector may include electrically conductive powders such as metal and/or carbon powders, woven or non-woven metal fibers, metal foam, woven or non-woven carbon fibers, or the like. Materials for the support include, for example, stainless steel mesh, aluminum (Al) mesh, nickel (Ni) foam, and carbon paper. In other examples, the electrically conductive metal oxide (e.g., $RuO_2$) may function as the current collector and cathode 16 may not include a separate current collector.

In operation of Li—$O_2$ battery 10, cathode 16 is fed oxygen molecules 20 by an oxygen source 29. The oxygen source may be fluidly connected to a side of cathode 16 away from electrolyte 14. It is currently understood that the fundamental rechargeable cathode discharge reactions in aprotic lithium-oxygen battery 10 are:

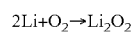

$$2Li + O_2 \rightarrow Li_2O_2$$

and possibly

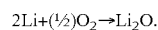

$$2Li + (\tfrac{1}{2})O_2 \rightarrow Li_2O.$$

Hence, insoluble $Li_2O_2$ 22 is formed via the oxygen reduction reaction (ORR) during the discharge reactions. The discharge reactions cause a voltage difference between anode 12 and cathode 16. During recharge of the Li—$O_2$ battery 10, a voltage is applied to anode 12 and cathode 16 via voltage source 26, and oxygen is evolved by decomposition of $Li_2O_2$ to $Li^+$ ions 18 via the oxygen evolution reaction (OER). As described above, the electrically conductive metal oxide (e.g., $RuO_2$) may provide ORR and OER activity, facilitating these reactions. Additionally, the electrically conductive metal oxide (e.g., $RuO_2$) may be substantially stable in the presence of $Li_2O_2$ and other intermediates and products of the OER and ORR.

In some examples, the electrically conductive metal oxide (e.g., $RuO_2$) may also be thermally stable at temperatures which Li—$O_2$ battery 10 is likely to experience, along with temperatures within a safety margin above normal operating temperatures of Li—$O_2$ battery 10. For example, electrically conductive metal oxide (e.g., $RuO_2$) may exhibit thermal stability up to a temperature of about 220° C.

EXAMPLE 1

Figure 2:
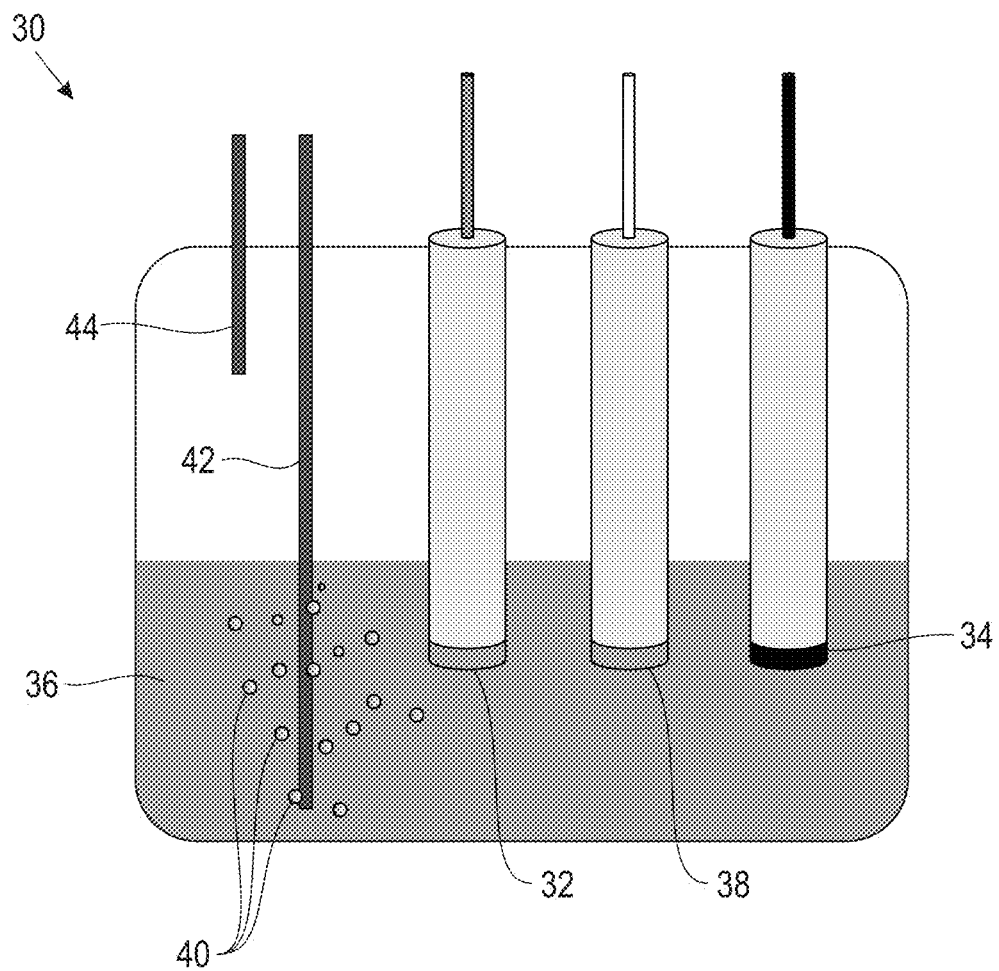
FIG. 2 is a conceptual and schematic diagram illustrating an example of a bulk electrochemical cell utilizing lithium-oxygen electrochemistry.

FIG. 2 is a conceptual and schematic diagram illustrating an example of a bulk electrochemical cell utilizing lithium-oxygen electrochemistry. $RuO_2$ thin films were deposited on a stainless steel disc (0.5" diameter) by sputtering. A bulk electrochemical cell 30 was prepared by placing two electrodes, i.e., a metallic lithium anode 32 and a $RuO_2$ coated stainless steel disc 34, in electrolyte 36. A solution of 0.25 molar (M) LiTFSI in DME was used as electrolyte 36. Lithium was used as a reference electrode 38. Cell 30 was bubbled with oxygen ($O_2$) or argon (Ar) 40 from $O_2$ or Ar source 42 during the measurement. Excess $O_2$ or Ar was removed from cell 30 using an outlet 44.

Figure 3:
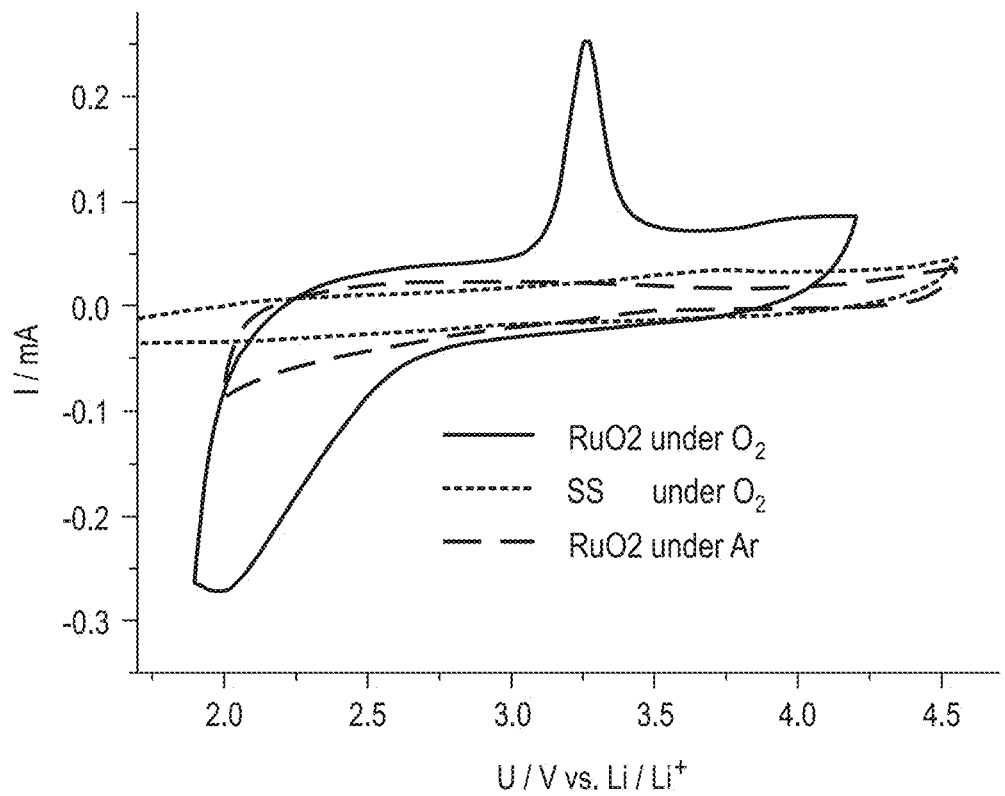
FIG. 3 is a cyclic voltammogram of examples of electrochemical cells with either stainless steel or ruthenium oxide-coated stainless steel electrodes.

Cyclic voltammetry (CV) was used to investigate ORR (oxygen reduction reaction) and OER (oxygen evolution reaction) activities of the $RuO_2$ surface. FIG. 3 presents a cyclic voltammogram of a stainless steel cathode and a cathode including $RuO_2$ coated stainless steel disc 34. The stainless steel cathode does not show any redox activities during CV measurement in an $O_2$ environment. In comparison, the $RuO_2$ coated stainless steel disc 34 shows clear redox activities in an $O_2$ environment. When Ar gas was introduced instead of $O_2$, the redox activity of $RuO_2$ coated stainless steel disc 34 disappears, suggesting the redox activity is ORR and OER on the $RuO_2$ surface.

EXAMPLE 2

Figure 4:
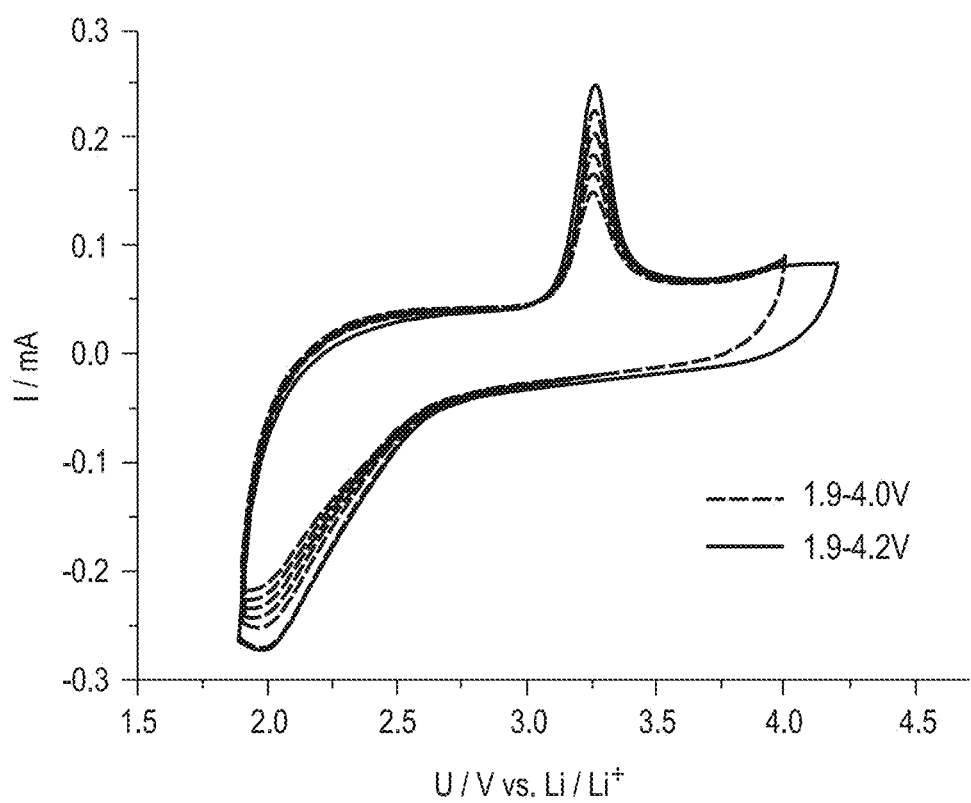
FIG. 4 is a cyclic voltammogram illustrating an example of cycle stability of a ruthenium oxide electrode.

The cycling stability of an electrode including $RuO_2$ was tested with CV. FIG. 4 is a cyclic voltammogram illustrating an example of cycle stability of a ruthenium oxide electrode under the same experimental setup in Example 1. FIG. 4 illustrates stable cycling behavior of the electrode including $RuO_2$ between potentials of 1.9 volt (V) and 4.2 V. FIG. 4 also illustrates that instability was exhibited when cycling from 1.9 V to 4.0 V. This suggests that the lower voltage of 4.0 V may have been insufficient to fully remove all material deposits on the surface of the electrode during the oxygen evolution reaction. However, considering that stable cycling of a carbon based cathode uses a potential range of 2.0 V to 4.55 V, $RuO_2$ shows cycling stability for a lower potential range.

EXAMPLE 3

Figure 5:
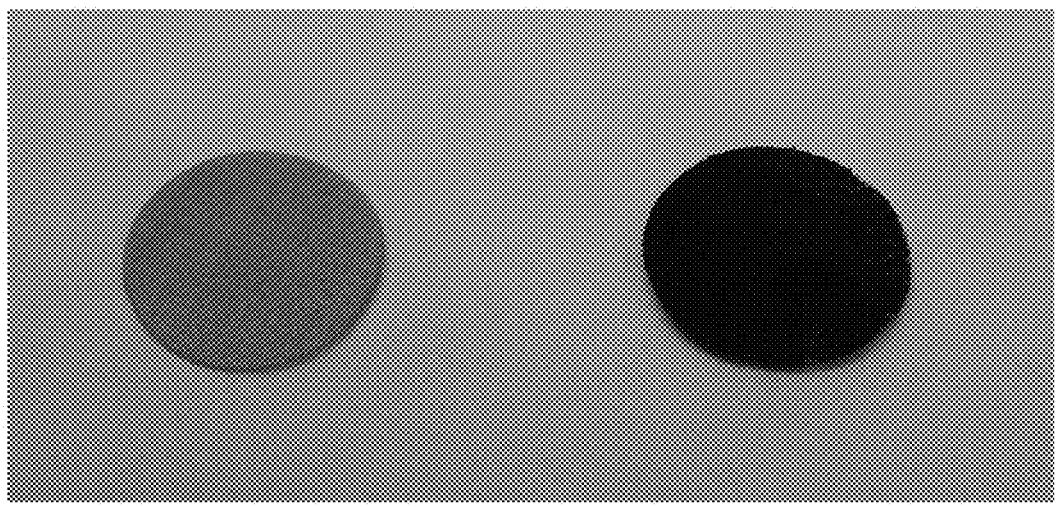
FIG. 5 is an image of an example of a porous cathode prepared by spreading ruthenium oxide paste on a stainless steel mesh.
Figure 6:
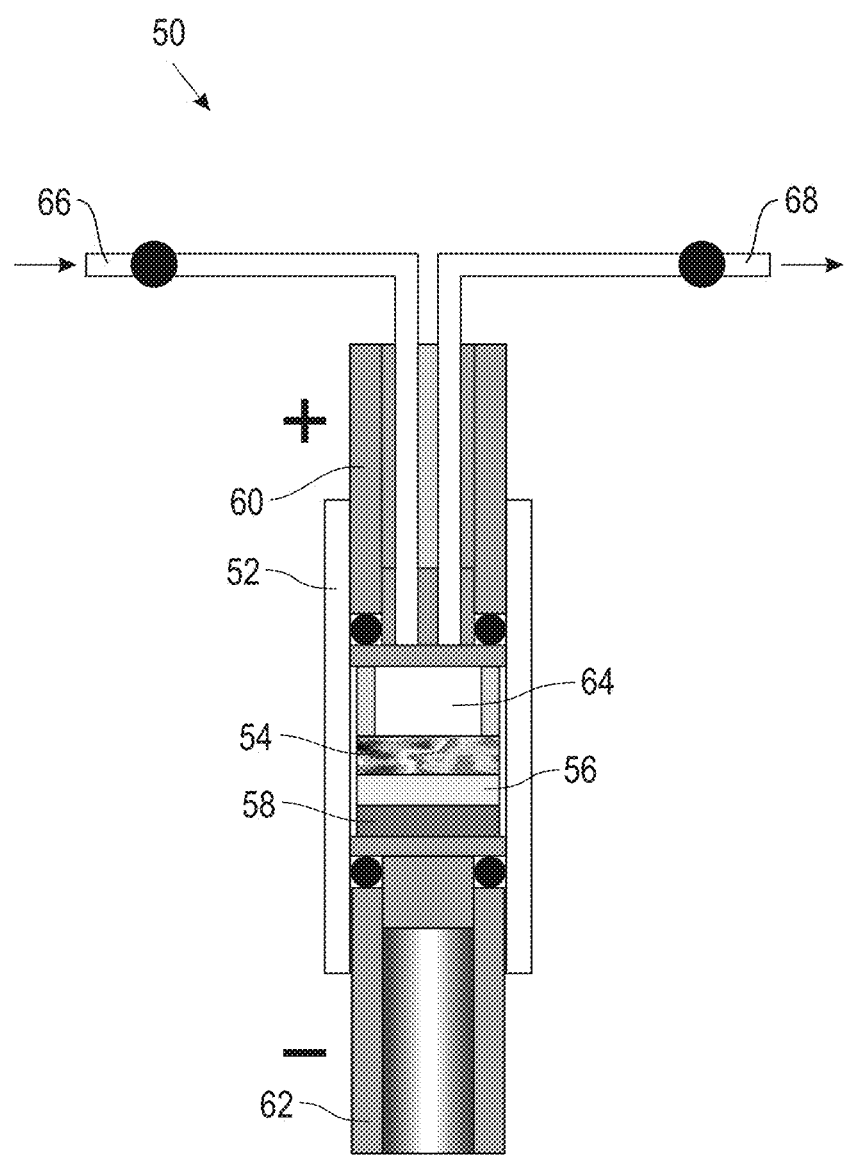
FIG. 6 is a conceptual and schematic diagram illustrating an example of a lithium-oxygen battery with a Swagelok® type geometry.

A Li—$O_2$ battery was prepared to test discharging and charging properties. FIG. 5 is an image of an example of a porous cathode prepared by spraying $RuO_2$ paste on a stainless steel mesh. Stainless steel mesh (left side of FIG. 5) was cut into ½ inch diameter segments and coated with $RuO_2$ paste, which was prepared by mixing $RuO_2$ powder with 20 weight percent (wt. %) of polytetrafluoroethylene (PTFE) in a water dispersion. A battery was assembled using a Swagelok® type geometry. FIG. 6 is a conceptual and schematic diagram illustrating an example of a Li—$O_2$ battery with a Swagelok® type geometry. Li—$O_2$ battery 50 includes quartz tubing 52 forming a package for cathode 54, electrolyte/separator 56, and Li anode 58. Li metal anode 58 was about 248 microns thick. Electrolyte/separator 56 included a monolayer polypropylene separator available under the trade designation Celgard® 2400 from Celgard, LLC, Charlotte, N.C., soaked in 0.25M LiTFSI in DMF solution. Cathode 54 included a $RuO_2$-coated stainless steel mesh.

A positive terminal 60 was electrically connected to cathode 54, and a negative terminal 62 was electrically connected to Li anode 58. Above cathode 54 was a head space 64, which provided a manifold for oxygen entering Li—$O_2$ battery 50 from oxygen inlet 66 and gases exiting Li—$O_2$ battery 50 via outlet 68.

Figure 7:
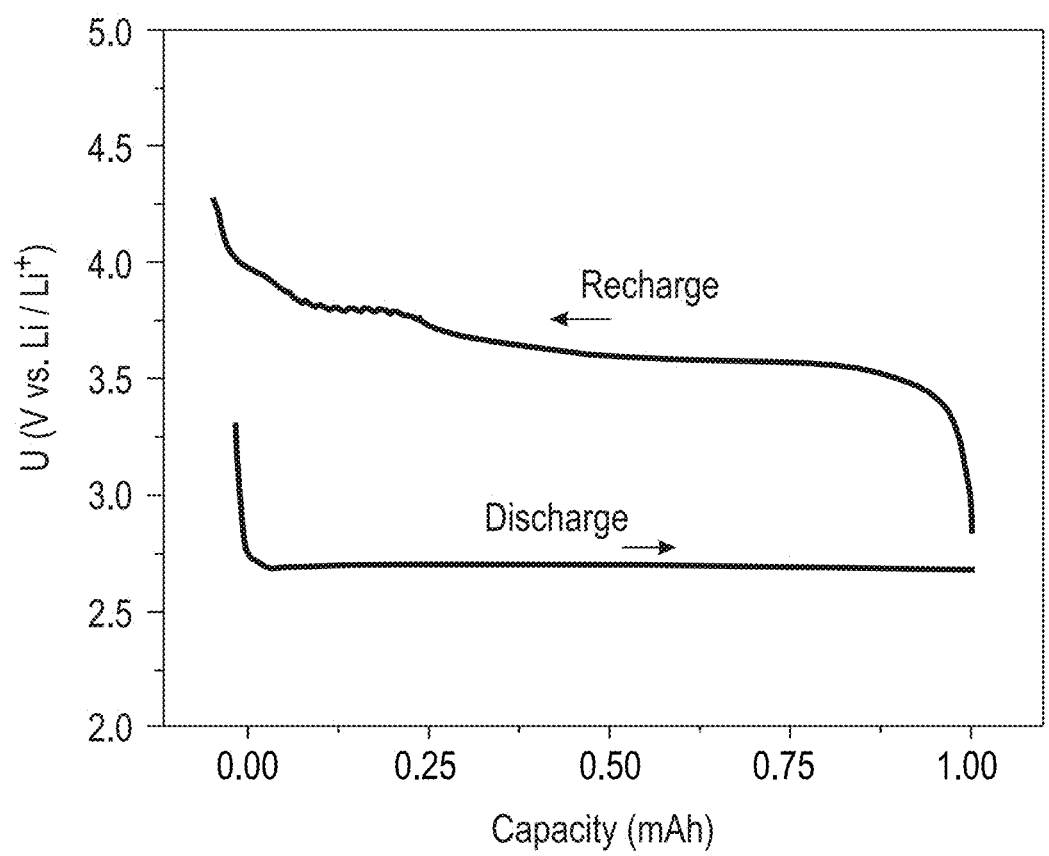
FIG. 7 is a plot of discharge and recharge behavior of an example of a lithium-oxygen battery with a cathode including ruthenium oxide.
Figure 8:
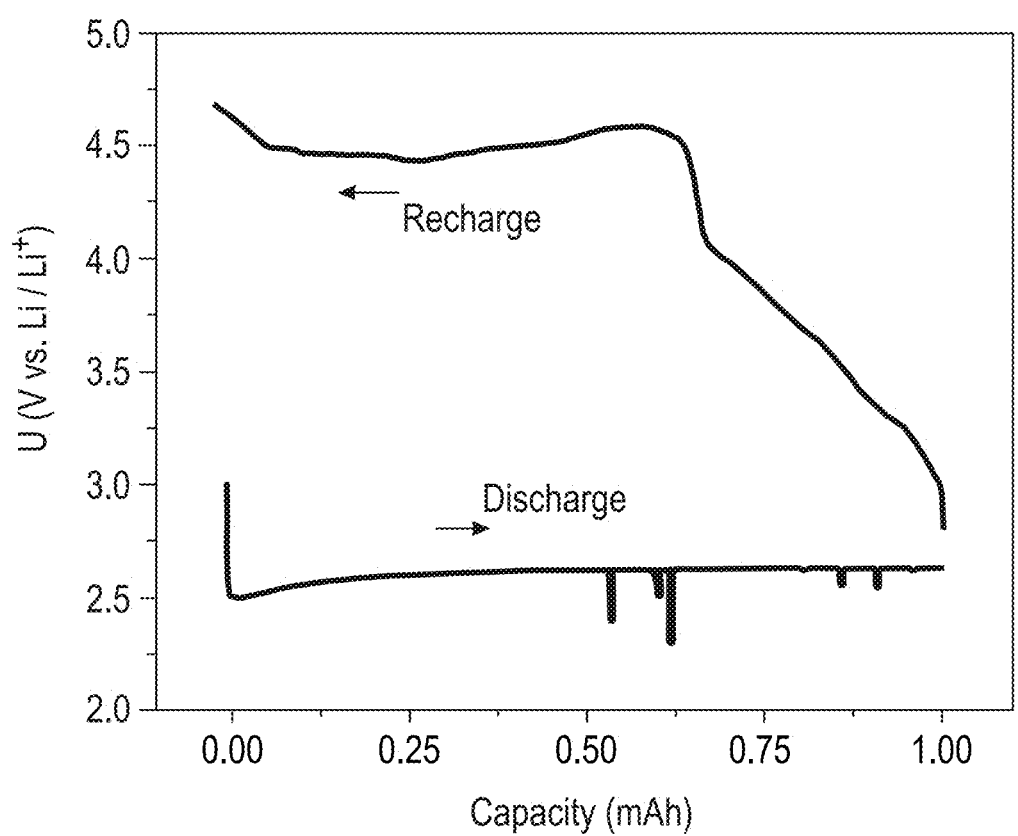
FIG. 8 is a plot of discharge and recharge behavior of an example of a lithium-oxygen battery with a cathode including carbon.

Battery 50 was discharged/recharged with 200 µA for 5 hours while monitoring the consumption and generation of $O_2$. FIG. 7 is a plot of discharge and recharge behavior of an example of a Li—$O_2$ battery with a cathode including $RuO_2$. FIG. 8 is a plot of discharge and recharge behavior of an example of a Li—$O_2$ battery with a cathode including carbon. The Li—$O_2$ battery with the carbon cathode included a geometry similar to that of the Li—$O_2$ battery with the $RuO_2$-coated stainless steel mesh cathode.

FIG. 7 shows that the Li—$O_2$ battery utilizing the $RuO_2$-coated stainless steel mesh cathode offers very stable discharge potential. For recharge, the cell with the $RuO_2$-coated stainless steel mesh cathode shows much lower recharging potential than a carbon cathode. The cell including the carbon cathode shows almost a linear increase of potential during the entire period of recharging. This suggests that a $RuO_2$-coated stainless steel mesh cathode allows less overpotential during recharging, which may reduce any likelihood of decomposing materials in the cell during recharging.

Figure 9:
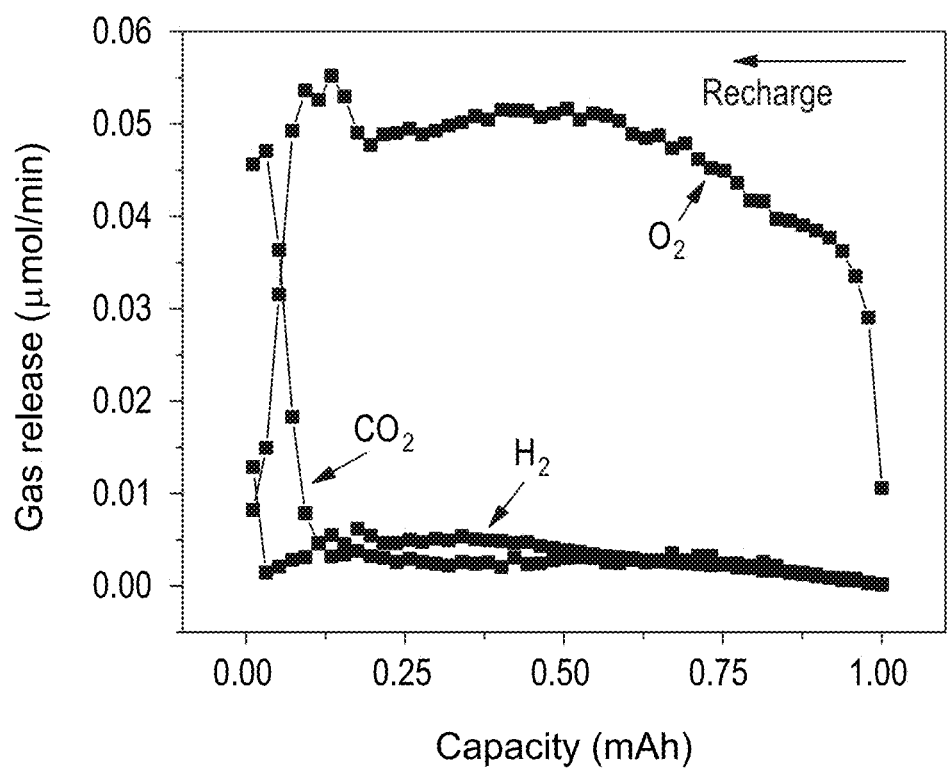
FIG. 9 is a plot of gas evolution during discharge of an example of a lithium-oxygen battery with a cathode including ruthenium oxide.

FIG. 9 is plot of gas evolution during discharge of an example of a Li—$O_2$ battery with a cathode including $RuO_2$. The Li—$O_2$ battery had the Swagelok® geometry described above. Gas evolution was measured using DEMS (differential electrochemical mass spectroscopy). As shown in FIG. 9, $O_2$ evolves during recharging and some $CO_2$ evolves at the very end of the recharge, which may be due to another chemical reaction in the cell, such as a reaction in the electrolyte. Also, a very small amount of $H_2$ evolves, which is believed to be due to possible decomposition of the electrolyte and/or trace amounts of water in the electrolyte.

EXAMPLE 4

Figure 10:
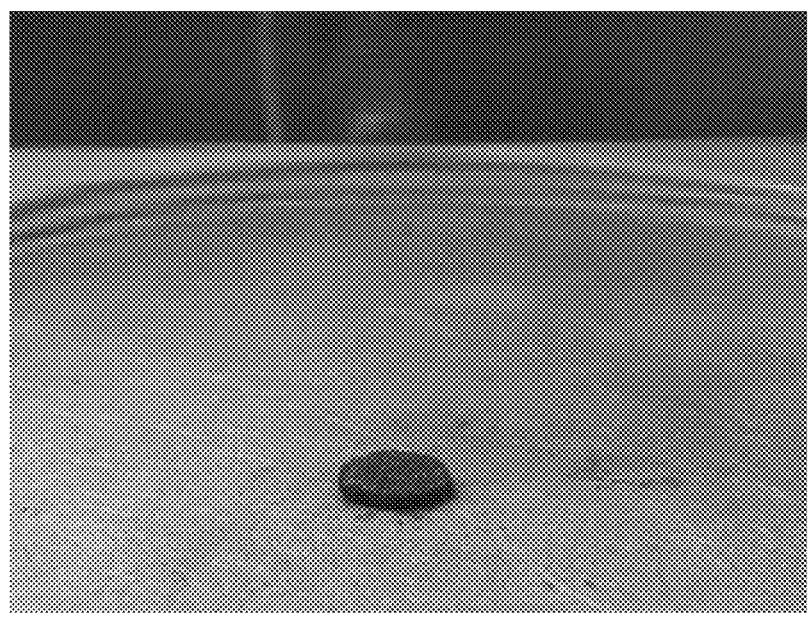
FIG. 10 is an image showing an example of a $RuO_2$-based cathode when heated to a temperature close to a decomposition temperature of lithium peroxide.

The reaction of the discharge product of the Li—$O_2$ battery with cathode materials was tested. A carbon-based cathode (Ketjenblack® with PTFE binder) and $RuO_2$-based cathode were prepared using Ni foam as the current collector and discharged with 0.25M LiTFSI in DME electrolyte. The amount of discharge was controlled similarly for the two cells: 280 mAh/g for the carbon cathode and 300 mAh/g for the $RuO_2$-based cathode. The discharge cathodes were rinsed with solvent in a dry box to remove lithium salt residue and dried. The discharged cathodes were placed on a hot plate with a set temperature close to the decomposition temperature of lithium peroxide (about 195° C.) under ambient conditions. FIG. 10 is an image showing the $RuO_2$-based cathode when heated to a temperature close to a decomposition temperature of lithium peroxide. The $RuO_2$ cathode does not show any evidence of reaction under these experimental conditions, which indicates that the $RuO_2$ cathode is stable with the discharge products of the Li—$O_2$ battery (e.g., $Li_2O_2$). In contrast, for a carbon-based cathode, a strong exothermic reaction may occur between carbon and the products deposited on the cathode during discharge (e.g., $Li_2O_2$).

EXAMPLE 5

Figure 11:
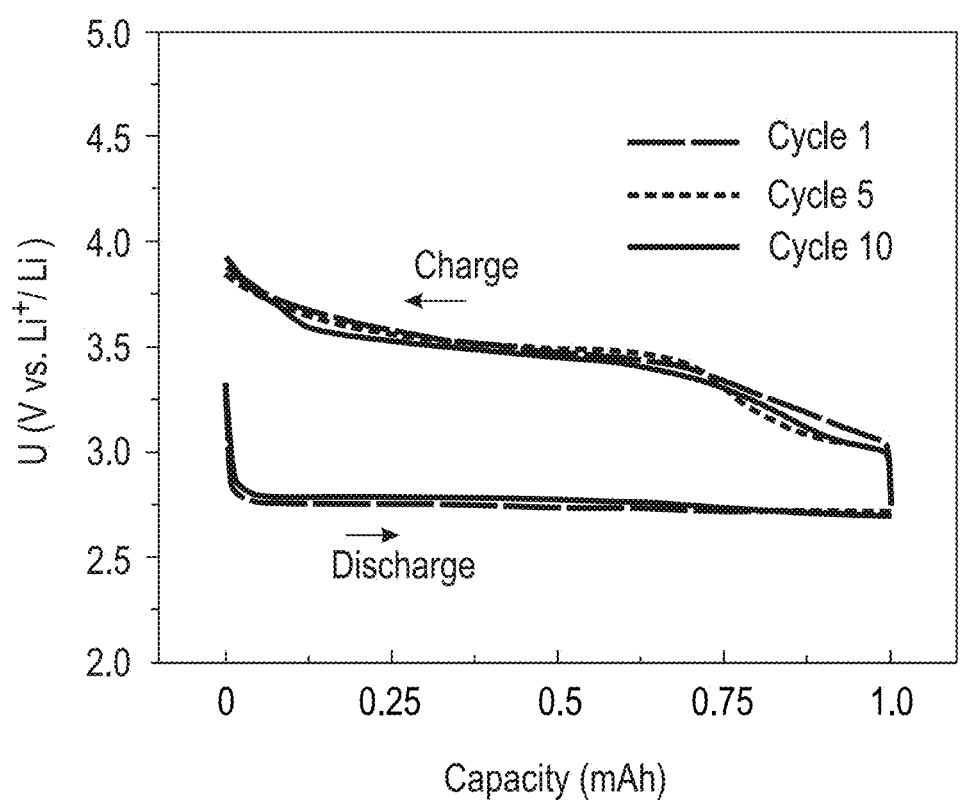
FIG. 11 is a plot of discharge and recharge behavior over 10 cycles of an example of a lithium-oxygen battery with a cathode including ruthenium oxide.

The cyclability of the Li—$O_2$ battery with a $RuO_2$-based cathode was tested. Material stacks for the battery were: Li metal anode (248 micron thick)/a glass fiber membrane soaked in 0.1M $LiClO_4$ in DMSO/$RuO_2$-coated stainless steel mesh cathode. FIG. 11 is a plot of discharge and recharge behavior of the $LiO_2$ battery over 10 cycles. Similar to the results shown in FIG. 7, the recharge potential is lower than for a carbon-based cathode, which is very likely due to no passivation of the cathode surface with lithium(alkyl) carbonates. As shown in FIG. 11, discharging/recharging behavior is very stable up to 10 cycles, which indicates stable and good cyclability of the Li—$O_2$ battery with the $RuO_2$-based cathode.

Various examples have been described. These and other examples are within the scope of the following claims.

The invention claimed is:

1. A lithium-oxygen battery comprising:
   an anode comprising lithium;
   a cathode defining a surface in contact with oxygen, wherein the cathode comprises ruthenium oxide, wherein the cathode is covered by ruthenium oxide over more than 50% of its surface, wherein the cathode is substantially free of carbon; and
   a non-aqueous electrolyte between, and in contact with, both the anode and the cathode.

2. The lithium-oxygen battery of claim 1, wherein the cathode further comprises at least one additional electrically conductive metal oxide.

3. The lithium-oxygen battery of claim 2, wherein the at least one additional electrically conductive metal oxide comprises at least one of a titania suboxide ($TiO_{2-x}$), $WO_2$, $SrRuO_3$, $CrO_2$, $MoO_2$, $RhO_2$, $TcO_2$, $ReO_2$, and $IrO_2$.

4. The lithium-oxygen battery of claim 1, wherein the cathode further comprises an electrically conductive current collector, and wherein the ruthenium oxide is attached to a surface of the conductive current collector.

5. The lithium-oxygen battery of claim 1, wherein the cathode defines a porous structure.

6. A method comprising:
   forming a cathode comprising ruthenium oxide, wherein the cathode is covered by ruthenium oxide over more than 50% of its surface, and wherein the cathode is substantially free of carbon;
   forming an anode comprising lithium; and
   assembling the cathode and the anode with a non-aqueous electrolyte to form a lithium-oxygen battery, wherein the non-aqueous electrolyte is between, and in contact with, both the anode and the cathode.

7. The method of claim 6, wherein forming the cathode comprising ruthenium oxide comprises forming a cathode comprising ruthenium oxide and at least one of a titania suboxide ($TiO_{2-x}$), $WO_2$, $SrRuO_3$, $CrO_2$, $MoO_2$, $RhO_2$, $TcO_2$, $ReO_2$, and $IrO_2$.

* * * * *